July 6, 1965
S. G. JOHNSON
3,192,634
DIMENSIONAL GAGE FOR LARGE DIAMETERS
Filed Nov. 22, 1963
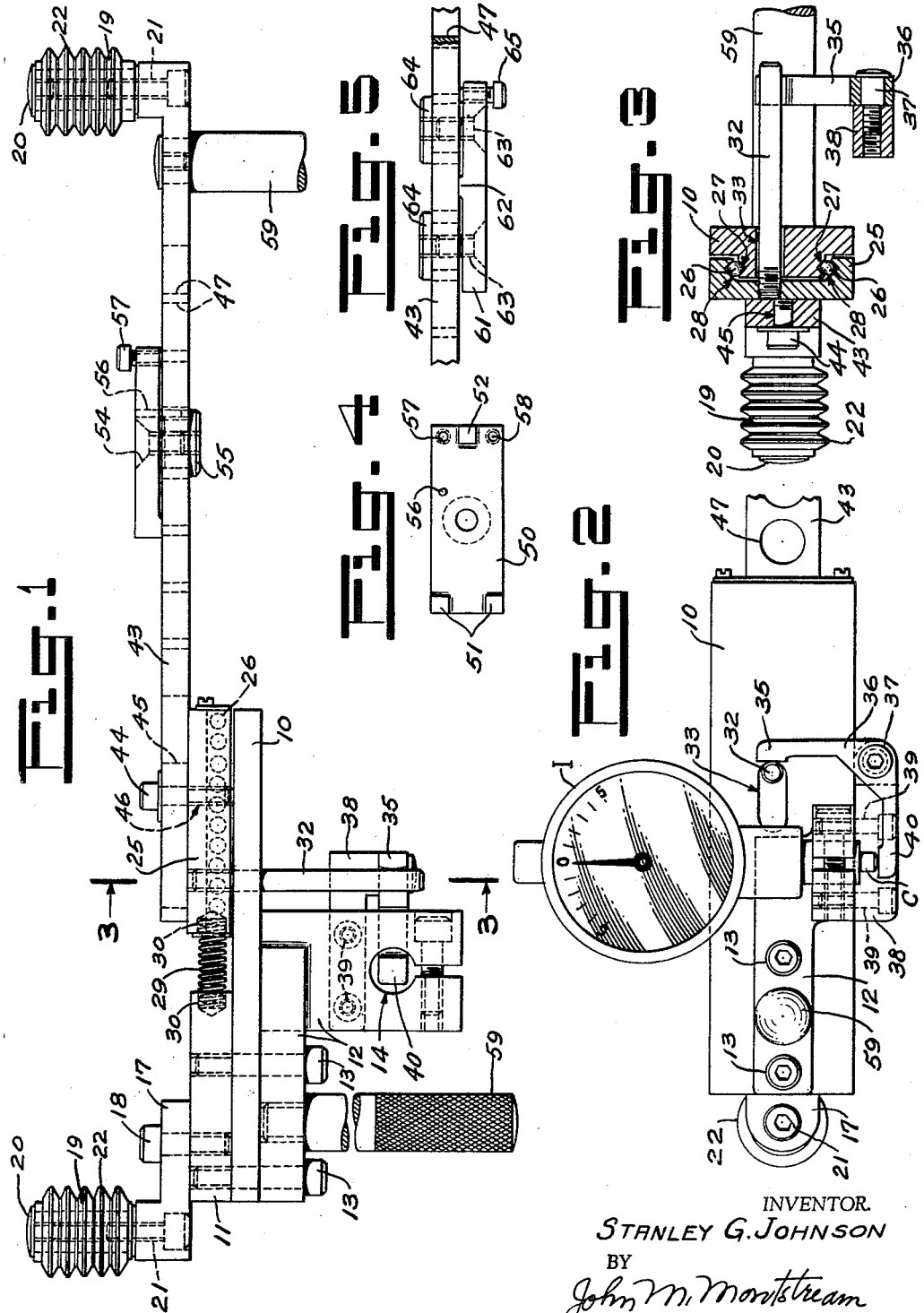
INVENTOR.
STANLEY G. JOHNSON
BY
John M. Montstream
ATTORNEY 3,192,634
DIMENSIONAL GAGE FOR LARGE DIAMETERS
Stanley G. Johnson, West Hartford, Conn., assignor to
The Johnson Gage Company, Bloomfield, Conn., a
corporation of Connecticut
Filed Nov. 22, 1963, Ser. No. 325,532
11 Claims. (Cl. 33—147)

The invention relates to a portable dimensional gage for determining the accuracy of a test part and particularly a diametrical dimension of substantial size. The gage may be used for testing the accuracy of external as well as internal diameters, although it is designed more particularly for the gaging of internal diameters. The gage may have gaging elements with gaging surfaces suitable for gaging plane surfaces, screw threads or other grooves, and the like.

It is an object of the invention to construct a portable dimensional gage for use primarily for gaging large diameters and having a relatively long gaging bar or arm which bends slightly when gaging and in which the gaging bar is provided with means for introducing a compensating bend in the bar.

Another object of the invention is to provide a simple means for imparting an initial reverse or compensating bend in a bendable bar or arm of the gage and which compensation enables the amount of compensation to be adjusted.

A still further object is as above with the compensating means also being constructed to effect a correcting twist in the elongated bar or arm.

Another object is to construct an elongated gaging bar combination for a dimensional gage which bar has slight flexibility in gaging use and provide compensating means to insert a compensating bend into the bar.

Another object is as in the preceding paragraph and includes twisting screw means.

Other objects of the invention will be more apparent from the following description when taken in connection with the accompanying drawings illustrating preferred embodiments thereof in which:

FIG. 1 is a side view of the gage without an indicator;
FIG. 2 is a partial front view of the gage with an indicator;
FIG. 3 is a section taken on line 3—3 of FIG. 1;
FIG. 4 is an enlarged view of the bending member of the compensating means; and
FIG. 5 shows another form of the compensating means mounted on a gaging bar which is partly shown.

The gage includes a base or frame 10 of any suitable construction having a spacer carried thereby and forming a part of the base. The base also includes a bracket 12 which is shown as a separate member and secured to the base 10 by screws 13. This bracket has an indicator mounting means shown as a hole 14 to receive the stem of an indicator I having a contactor C.

A gaging bar or arm 17 is secured to the base and particularly on the spacer 11 by means of a screw 18 so that the arm may be replaced such as by an arm of greater length in order to enable the gage to test a part or surface having a greater dimension or diameter. The arm carries a gaging element, shown particularly as a gaging roll 19, which is mounted for rotation on a suitable stud 20. This stud is secured on the bar by a screw 21 which is received in a hole in the end of the bar. The gaging element particularly illustrated is for gaging screw threads in that the roll has spaced gaging ridges 22 around its periphery for engaging either internal or external threads.

A slide 25 (FIG. 3) is suitably mounted on the base for movement towards and away from the gaging element 19. The mounting means particularly shown includes balls 26 which are received between ball races or grooves 27 carried by the base and grooves 28 carried by the slide. Spring means is provided to propel the slide outwardly for gaging an internal diameter which means constitutes a spring 29 between the slide and the spacer. The spring is suitably retained in position such as by holes 30 in the adjacent faces of the spacer and slide which holes receive the ends of the spring.

An operating connection of any suitable construction is provided between the slide and the indicator I, that shown including an operating pin 32 carried by the slide 25 which pin passes through a slot 33 in the base or frame and the end of the slot limits the outward movement of the slide. This operating pin engages a lever arm 35 of an operating lever 36 which is pivotally carried by the base on a pivot 37. The pivot is shown as carried by a pivot member 38 which is secured to the base or particularly to the bracket 12 by screws 39 and forms a part of the base. The operating lever has a lever arm 40 extending at right angles with respect to the lever arm 35 and engages the contactor C of the indicator I. The end of the lever arm 40 is, therefore, located adjacent to the indicator mounting means 14 and in alignment therewith.

A gaging bar or arm 43 is secured to the slide 25 in any suitable manner that illustrated being a screw 44 which passes through a slot 45 in the end of the bar and which screw is threaded into a hole 46 in the slide. The slot enables adjustment of the position of the gaging bar on the slide. A gaging element is carried on the end of the bar 43 and as particularly shown is a gaging roll 19 identical with that on arm 17, having gaging ridges 22 for a thread. The gaging element is mounted on a stud 20 which is secured in place by a screw 21 passing through a hole in the end of the bar. The gaging ridges are of thread configuration and extend around the periphery of the roll for engagement with the thread to be gaged.

Since the gaging of large diameters usually implies a piece of work which is heavy and therefor cannot be brought to the gage, the gage must, therefore, be easily portable and brought to the work. It is desirable that the gage be light in weight and to achieve this, the long gaging bar 32 has a series of holes 47 through the bar throughout most of its length to lighten the weight of this part, also in order to achieve lightness, the bar is made of relatively small dimension in cross-section. It will be noted that the gaging element 20 necessarily has an over hang with respect to the bar. Because of this, under the pressure of the spring pressing the gaging elements into contact with a test piece, sufficient force is exerted on the gaging element to bend the long bar 43 slightly, the amount of the bend being related to the length and dimensions of the bar and the strength of the spring. Because of the bent bar, the axis of the gaging element when gaging is tilted radially inwardly slightly and an inaccurate reading will result.

To overcome this, compensating means have been provided on the long gaging bar 43 to introduce an initial compensating reverse bend in the bar. The compensating means of FIG. 1 constitutes a bending member 50, FIG. 4, having pad means shown as spaced pads 51, 52 on one face thereof and at opposite ends of the bending member. As shown three pads are provided, two at one end and one at the other or outer end and centrally of the sides of the member, the purpose of which will appear hereinafter. The bending member has a central hole 53 therethrough in which is received clamping means of suitable form, shown as being a screw 54 and nut 55 which nut is received in one of the holes 47 in the bar but engages the outer or opposite face of the bar from the bending member. A screw threaded into the bending member could be used. The screw or clamping means is spaced from the pads. This compensating means described is mounted between the ends of the bar and is shown located centrally or in the central region between the ends of the bar and for an internal gage is mounted on the same side of the bar as the gaging element.

Upon tightening of the clamping means, the member is secured to the gaging bar and upon sufficient additional tightening of the clamping means, the bar will bend between the pads sufficiently to put a compensating reverse bend in the bar or downwardly as viewed in FIG. 1. The compensating means, therefore, enables the amount of reverse or compensating bend put into the bar to be selected or adjusted by tightening or loosening of the clamping means. The amount of compensating bend to be inserted is determined by test. A pin 56 may be provided to anchor the bending member against turning.

As a consequence of the compensating reverse bend provided in the bar, the axis of the gaging element or roll initially inclines at a slight angle outwardly with respect to the axis of the test piece or thread or the axis of the gage. When however, the gage is inserted or positioned on the test piece, the pressure applied by the spring means 29 between the test piece and the gaging element 19 brings the axis of the gaging element into alignment or parallel with the axis of the test piece and an accurate test of the desired dimension is secured.

Sometimes the bar may have a warp or twist. This can be corrected by tightening a screw 57 or 58 provided in threaded holes in the bending member. One such screw is provided on each side of the central pad 52. By screwing one of the screws into pressing contact with the gaging bar or arm, the bar can be twisted sufficiently to correct an inherent or fixed twist in the bar and in this manner correct the twist and bring the axis of the gaging element into the plane of the axis of the test part.

A gage for testing large diameters usually is provided with a series of gagging bars of different lengths which can be substituted for the long bar particularly illustrated. In order to further increase the range of the gage, the gaging bar 17 of the cooperating gaging means may be removed and substituted by a bar of increased length which bar may also have a compensating bending means mounted thereon. The gage particularly illustrated is designed for gaging internal diameters or threads of large diameter.

To gage a test surface, the slide and the gaging element on the long bar 43 is contracted inwardly such as by handles 59 whereupon the gaging elements are inserted within the test hole and allowed to expand under the pressure of the spring 29 into contact with the thread or surface. The operating pin 32 engages the lever arm 35 of the operating lever 36 to pivot this lever in a direction to press the other lever arm 40 upwardly or towards the indicator mounting means 14 and move the contactor C of the indicator. A reading of the dial of the indicator gives the accuracy of the internal diameter.

The gaging elements particularly shown are rolls with a plurality of gaging ridges for testing the assemblability of the test thread with its mating thread. These rolls may be substituted for rolls having one or two gaging ridges for gaging a thread for accuracy of the pitch diameter. Likewise the rolls may be replaced by known gaging segments if desired. The gage particularly illustrated shows two gaging bars, however, the gage may be constructed with three such bars equally spaced angularly in known fashion. The two bar gage is preferable because it provides a wider range in a simpler manner and more compactly since one gaging bar may be long and the cooperating bar may be short as shown. It is immaterial in this short bar, long bar construction which bar is mounted on the slide.

FIG. 5 illustrates another form of compensating means which functions in the same manner as the compensating means of FIG. 4. In this construction, a bending member 61 has pad means shown as a central pad 62 between its ends which is raised above the surface of the bending member. The pad engages the gaging bar. Clamping means is carried by the bending member and the bar to both secure the member to the elongated gaging bar and also to apply a compensating bend to the bar. The clamping means includes two screw means, one being received in each hole in the ends of the bending member and a hole 47 in the gaging bar so that the screw means engages and is between the same. The screw means may include a screw 63 and nut 64 and is spaced from the pad means. This bending member differs further from that of FIG. 4, in that it is mounted on the opposite side of the gaging bar from that of FIG. 4, and hence on the opposite side from the gaging element, but inserts the compensating bend in the gaging bar in the same direction. This compensating means is adjustable by tightening or loosening one of the screw means so that the amount of bend applied to the gaging bar can be adjusted. The proper amount of the bend applied can be determined by testing the bend put into the bar by inserting the gage into a test part or between test surfaces. This bending member also carries a twist screw 65 at each edge of the member.

For a gage which has a short gaging bar and a long gaging bar, it is immaterial whether the base or the slide carries the long bar. It is clear that both bars may be long and each bar is then provided with the compensating means described. Likewise with a plurality of different lengths of gaging bars the range of the gage may be from about 4 inches to a substantially greater dimension such as about 30 inches. Also the cooperating gaging means may be of other known arrangements other than the single gaging bar 17 shown. The cooperating gaging means of whatever form is in alignment with the other gaging means. The indicator is shown as carried by the base and operated by the movement of the slide. The indicator may be mounted on one of these parts and the contactor be operated by engagement with or relative movement of the other.

For gaging external surfaces such as threads, the spring means 29 exerts a pull to draw the slide inwardly and the compensating means is mounted on the other side of the gaging bar since the bend in the gaging bar will be in the opposite direction.

This invention is presented to fill a need for improvements in dimensional gage for large diameters. It is understood that various modifications in structure, as well as changes in mode of operation, assembly and manner of use, may and often do occur to those skilled in the art, especially after benefiting from the teachings of an invention. This disclosure illustrates the preferred means of embodying the invention in useful form.

What is claimed is:

1. A dimensional gage for testing large diameters and using an indicator having a contactor comprising a base, a slide, mounting means mounting the slide on the base for movement thereon, spring means engaging the slide to propel the same on the base; gaging mechanism comprising a gaging means secured to the slide and cooperating gaging means secured to the base, at least one of said gaging means including a relatively long gaging bar having slight flexibility, each gaging means having a gaging element, the gaging element carried by said long gaging bar or bars being on the outer end thereof and projecting from a side thereof; indicator mounting means carried by one of the parts including the base and the slide and an operating connection carried by the other part and adjacent to the indicator mounting means so as to engage an indicator contactor; and compensating bending means mounted on said relatively long gaging bar in the region of the center thereof including a bending member, and clamping means engaging the bending member and the gaging bar to insert a compensating bend in the gaging bar.

2. A dimensional gage as in claim 1 in which the bending member has ends and a surface, pad means including a raised pad on said surface at each end of the bending member, and the clamping means for applying the compensating bend being screw means between the bending member and the bar at the center of the bending member and securing the member to the gaging bar and applying the compensating bend to the bar.

3. A dimensional gage as in claim 2 in which the pad means at one end of the bending member is centrally located and spaced from the edges of the bending member, and screw means carried by the bending member on each side of the centrally located pad and adapted to engage the gaging bar to impart twist thereto.

4. A dimensional gage as in claim 2 for internal gaging in which the spring means propels the slide outwardly and the bending member is mounted on the bar on the same side thereof as the gaging element.

5. A dimensional gage as in claim 1 in which the bending member has a pad between the ends thereof, and the clamping means being screw means at each end of the bending member and engaging the gaging bar and the bending member to secure the latter upon the bar and apply pressure to the bar to insert a compensating bend.

6. A dimensional gage as in claim 5 for internal surfaces in which the spring means propels the slide outwardly and the bending member is located on the side of the gaging bar oppositely from the gaging element.

7. A gaging bar combination for a dimensional gage comprising an elongated gaging bar having ends, the gaging bar having a length and cross-section such that the bar bends slightly under gaging pressure, means at one end to mount a gaging element thereon, means at the other end of the bar to secure the same to a gage, and compensating means secured to the bar in the central region thereof between its ends including a bending member, pad means on one surface of the bending member engaging the bar, and clamping means between the gaging bar and the bending member and spaced from the pad means to secure the bending member to the gaging bar and to apply a compensating bending pressure to the bar.

8. A gaging bar combination as in claim 7 in which the pad means includes pads at each end of the bending member, and the clamping means is located at the center of the bending member.

9. A gaging bar combination as in claim 8 in which the pad at one end of the gaging member is a central pad between the edges of the bending member, and a twisting screw carried by the bending member on each side of the central pad and engaging the gaging bar.

10. A gaging bar combination as in claim 7 in which the pad means comprises a central pad between the ends of the bending member and the clamping means includes a screw means at each end of the bending member.

11. A gaging bar combination as in claim 10 including a twisting screw carried by the bending member adjacent one end thereof and adjacent each side edge thereof.

No references cited.

ISAAC LISANN, *Primary Examiner.*